US009824482B2

(12) United States Patent
Kunath et al.

(10) Patent No.: US 9,824,482 B2
(45) Date of Patent: Nov. 21, 2017

(54) MAP VIEWER AND METHOD

(71) Applicant: Harman Becker Automotive Systems GmbH, Karlsbad (DE)

(72) Inventors: Peter Kunath, Munich (DE); Vladimir Ivanov, Munich (DE); Viktor Samokhin, Munich (DE); Alexey Pryakhin, Munich (DE); Marek Strassenburg-Kleciak, Garching b. Munich (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 403 days.

(21) Appl. No.: 14/064,910

(22) Filed: Oct. 28, 2013

(65) Prior Publication Data

US 2014/0125655 A1 May 8, 2014

(30) Foreign Application Priority Data

Oct. 29, 2012 (EP) ..................... 12190435

(51) Int. Cl.
| | |
|---|---|
| *G06T 15/00* | (2011.01) |
| *G01C 21/32* | (2006.01) |
| *G01C 21/36* | (2006.01) |
| *G06T 15/04* | (2011.01) |
| G06T 15/10 | (2011.01) |
| G06T 17/20 | (2006.01) |
| G06T 17/00 | (2006.01) |
| G06T 19/00 | (2011.01) |

(52) U.S. Cl.
CPC ............ *G06T 15/005* (2013.01); *G01C 21/32* (2013.01); *G01C 21/3638* (2013.01); *G06T 15/04* (2013.01); *G06T 15/00* (2013.01); *G06T 15/10* (2013.01); *G06T 17/00* (2013.01); *G06T 17/20* (2013.01); *G06T 19/00* (2013.01)

(58) Field of Classification Search
CPC ......... G06T 19/00; G06T 17/20; G06T 17/00; G06T 15/10; G06T 15/00
See application file for complete search history.

(56) References Cited

U.S. PATENT DOCUMENTS

| | | | | | |
|---|---|---|---|---|---|
| 6,157,342 | A * | 12/2000 | Okude | ............... | G01C 21/3635 340/995.14 |
| 6,201,544 | B1 * | 3/2001 | Ezaki | ................. | G01C 21/3638 345/419 |
| 6,628,278 | B1 * | 9/2003 | Ritter | ................. | G01C 21/3638 345/419 |
| 6,999,075 | B2 * | 2/2006 | Kumagai | ............. | G08G 1/0969 340/990 |
| 7,457,706 | B2 * | 11/2008 | Melero | ................... | G06T 17/05 382/311 |

(Continued)

*Primary Examiner* — Abderrahim Merouan
(74) *Attorney, Agent, or Firm* — Artegis Law Group, LLP

(57) ABSTRACT

Techniques for displaying a 3d map view of a 3d geographical map are provided. A database stores data which defines the 3d geographical map in a layered hierarchy comprising data layers which can be individually rendered for the 3d map view. The database comprises a data layer of a digital terrain model which is modelling a terrain surface and a data layer of a 3d road network comprising 3d road elements. A processor is configured for selecting specific data layers of the database in response to a resolution setting of the 3d map view and to render the 3d map view using the selected specific data layer.

18 Claims, 14 Drawing Sheets

(56) References Cited

U.S. PATENT DOCUMENTS

| | | | | |
|---|---|---|---|---|
| 7,714,860 B2* | 5/2010 | Trotta | G06T 17/00 345/427 |
| 8,310,361 B1* | 11/2012 | Stout | G06F 17/30241 340/539.11 |
| 8,984,099 B1* | 3/2015 | Giencke | H04L 67/10 705/14.49 |
| 2006/0224311 A1* | 10/2006 | Watanabe | G01C 21/3635 701/532 |
| 2006/0253246 A1* | 11/2006 | Cera | G08G 1/096861 701/117 |
| 2007/0271079 A1* | 11/2007 | Oguchi | H04B 17/3912 703/8 |
| 2008/0183382 A1* | 7/2008 | Asai | G01C 21/20 701/414 |
| 2009/0115779 A1* | 5/2009 | Shulman | G01B 11/2513 345/419 |
| 2010/0007669 A1* | 1/2010 | Bethune | G06T 3/40 345/520 |
| 2010/0049477 A1* | 2/2010 | Sivan | G06F 17/5009 703/1 |
| 2011/0054778 A1* | 3/2011 | Poiesz | G01C 21/3635 701/533 |
| 2012/0019513 A1* | 1/2012 | Fong | G01C 21/3673 345/419 |
| 2012/0056899 A1* | 3/2012 | Stroila | G01C 21/32 345/634 |
| 2012/0274625 A1* | 11/2012 | Lynch | G06T 17/05 345/419 |
| 2013/0027386 A1* | 1/2013 | Small | G06T 15/005 345/419 |
| 2013/0041583 A1* | 2/2013 | Samokhin | G01C 21/3638 701/428 |
| 2013/0069941 A1* | 3/2013 | Augui | G01C 21/36 345/419 |
| 2013/0131978 A1* | 5/2013 | Han | G01C 21/3638 701/436 |
| 2013/0300740 A1* | 11/2013 | Snyder | G06F 3/016 345/420 |
| 2013/0321472 A1* | 12/2013 | Piemonte | G01C 21/3664 345/672 |
| 2013/0332063 A1* | 12/2013 | Pirwani | G01C 21/32 701/409 |
| 2014/0267279 A1* | 9/2014 | Kontkanen | G06T 15/04 345/427 |
| 2014/0278065 A1* | 9/2014 | Ren | G06T 15/04 701/454 |
| 2014/0354628 A1* | 12/2014 | Lindberg | G06T 19/20 345/419 |
| 2015/0074611 A1* | 3/2015 | Kontkanen | G06F 3/04815 715/850 |

* cited by examiner

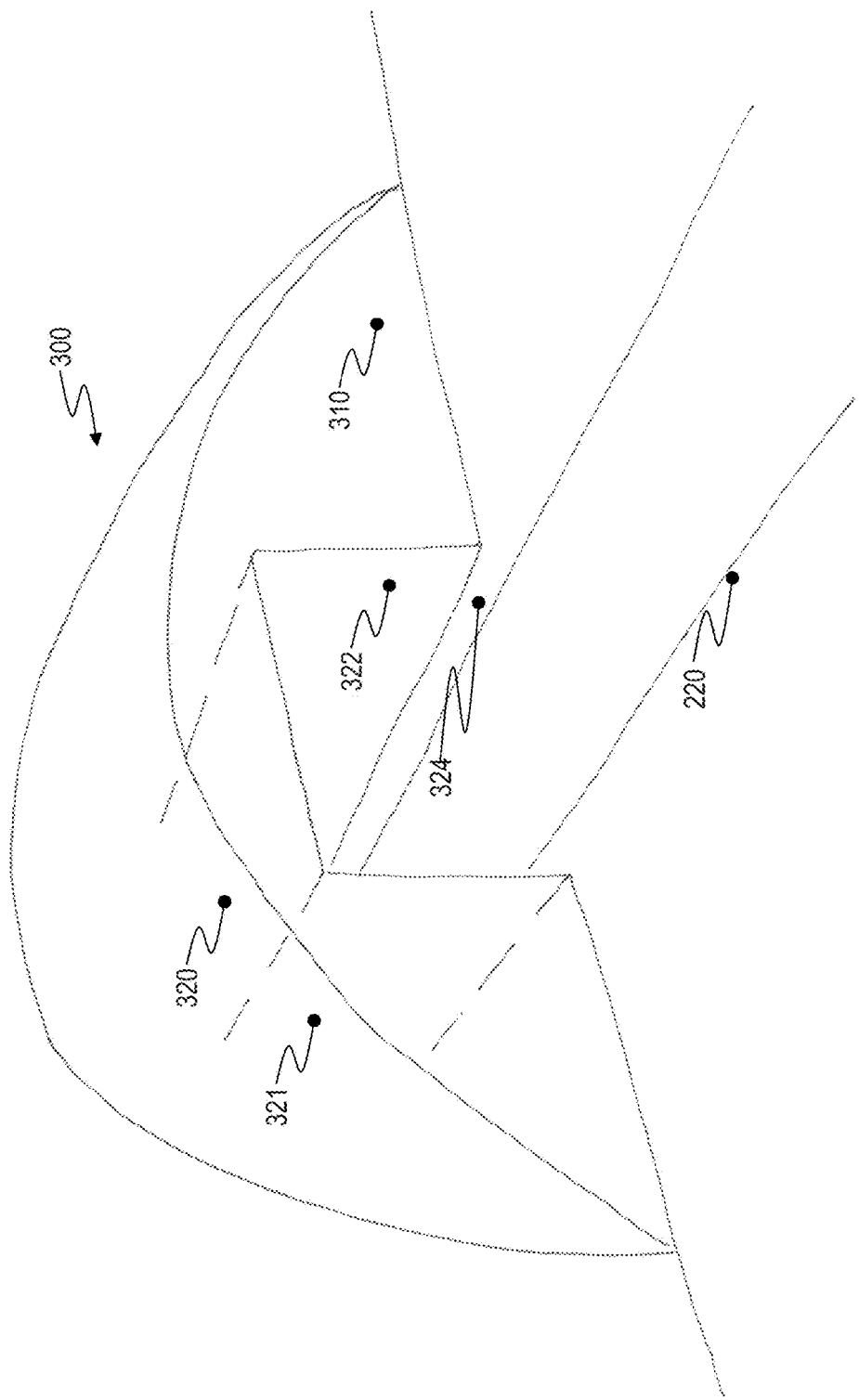

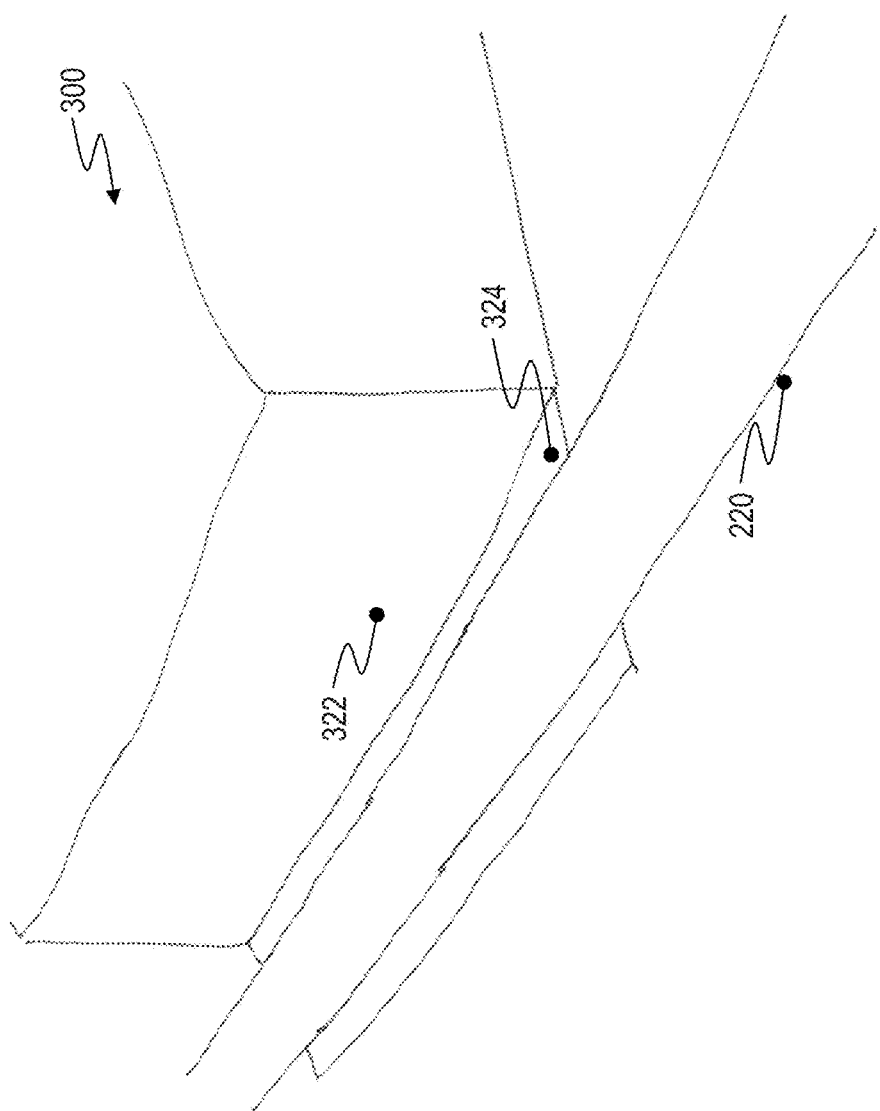

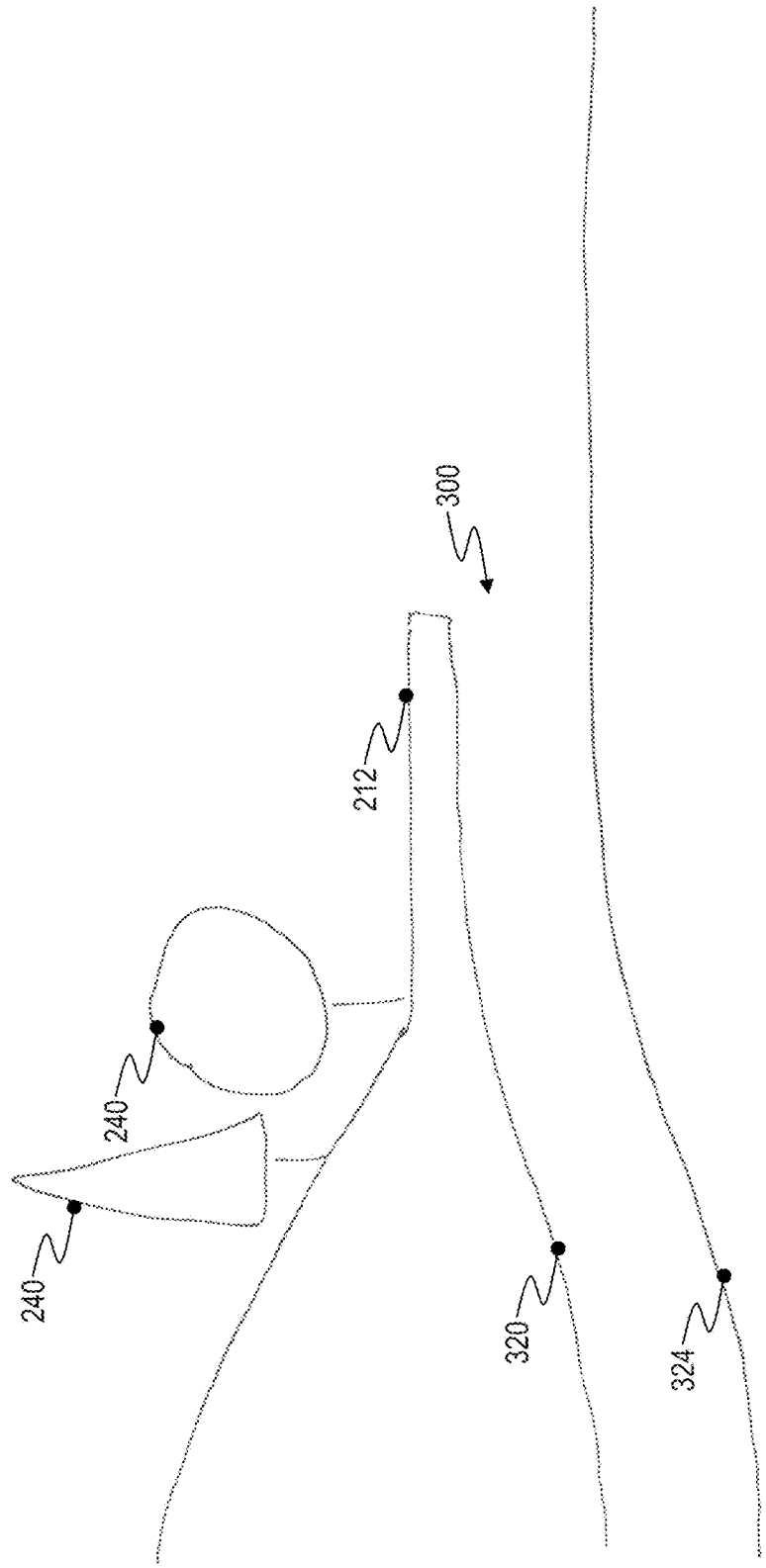

MAP VIEWER AND METHOD

CROSS-REFERENCE TO RELATED APPLICATIONS

This application claims priority to European patent application serial number EP12190435, filed Oct. 29, 2012, which is herein incorporated by reference.

TECHNICAL FIELD

Various embodiments relate to a map viewer and respective methods. In particular, various embodiments relate to a method of displaying a three-dimensional map view and a method of generating a database storing data which defines a three-dimensional geographical map which can be rendered to obtain the three-dimensional map view.

BACKGROUND

Map viewers for in-vehicle use have become increasingly widespread throughout recent years. For example, for use in connection with a navigation unit, displaying a geographical map as a map view on an optical output device such as a display is a common application.

Typical map views are two-dimensional (2d) or three-dimensional (3d) representations of a road network. In such applications, the road network is typically modelled by a graph consisting of vertices and edges. In the map view, the roads are illustrated as lines, e.g., with a certain thickness and derived from the edges and vertices of the graph.

Sometimes a higher degree of detail is desired. This may be particularly the case in urban areas where the road network comprises complex structures such as multi-lane crossings, tunnels, flyovers, bridges, etc. Moreover, the environment may be characterized by buildings, vegetation and points of interest (POIs) having a high recognition value. To provide easy orientation, it might be desired to display a more detailed graphical representation of such features in the map view.

In the art, solutions referred to as a 3d map view or often as 3d city map view are known. The 3d map views typically consist of a single 3d model of the landscape, i.e., terrain, buildings, POIs, including the road network and respective texturing of the 3d elements. They may allow for a high recognition value of the 3d map view and may therefore facilitate navigation.

Yet, such solutions face certain restrictions. For example, because the 3d map view is obtained from a single 3d model, it may be difficult to individually adapt the 3d map view according to user preferences and/or visualization needs. This may cause problems, in particular, on the borders of the 3d model where a smooth and continuous transition from the 3d model to the 2d map view using the graph representation of the road network is not possible or only possible to a limited degree. Moreover, the memory resources may be particularly high for a given level of detail for conventional 3d models.

Therefore, a need exists to provide techniques allowing for advanced 3d map views. In particular, a need exists to provide techniques which allow for the possibility to adapt and personalize the 3d map view having a high level of detail and, at the same time, reduce memory and calculation resources.

SUMMARY

This need is met by the features of the independent claims. The dependent claims define embodiments.

According to an aspect, a map viewer for displaying a three-dimensional (3d) map view of a 3d geographical map is provided. The map viewer comprises a database storing data which defines the 3d geographical map. The database stores the data in a layered hierarchy comprising data layers which can be individually rendered for a 3d map view. The database comprises at least a data layer of a digital terrain model which is modelling a terrain surface and a data layer of a 3d road network comprising 3d road elements. The map viewer further comprises a processor for rendering the 3d map view, wherein the processor is coupled to the database. The processor is configured to select specific data layers of the database in response to a resolution setting of the 3d map view and to render the 3d map view using the selected specific data layers of the database. The map viewer further comprises an optical output device, configured for displaying the rendered 3d map view.

The 3d geographical map may relate to a 3d city map or another 3d topographical map. The 3d geographical map may provide a comparably high level of detail, showing the details of the 3d road network and the terrain. The 3d map view may be comparably detailed providing a high recognition value for a user. For example, complex environments, such as multi-lane intersections or crossings or junctions, parking lots, road-overflies, points of interests such as landmarks or gas stations etc. may be included in the 3d map view.

For example, the database may comprise a storage unit. For example, the storage unit may comprise a memory such as a compact disc (CD), Blue-ray disc, hard disc drive (HDD), Flash memory or the like. The digital terrain model and the 3d road network may relate to raw data which can be used for the rendering of the 3d map view. For example, such raw data for the rendering of the 3d map view may comprise 3d elements or 3d polygons or 3d wireframes (gridding) which may allow rendering techniques to be employed which are commonly known to the skilled person and therefore need not be explained in detail hereinafter.

The layered hierarchy of the database may enable a well-defined level of detail or level of granularity of the 3d map view, because each layer may be rendered individually, i.e., separately and independently; different rendered layers, e.g., present in the form of pixel image, may be overlaid or superimposed to each other to form the 3d map view. For example, it may be possible to select only a single data layer for said rendering—in such a case only 3d elements related to that single selected data layer may be visible in the 3d map view. This may allow for a low level of detail, respectively a high level of hierarchy. Such a scenario may be desirable, e.g., for a particular resolution setting of the 3d map view. Of course, it may be possible to select any arbitrary number of data layers for the rendering; e.g., all or a fraction of all data layers.

Rendering may relate to calculating of a graphical representation of the raw data of the data layers; the raw data is sometimes referred to as a scene. The rendering may take into account elements selected from the following group: virtual camera position, 3d elements and/or digital terrain model; texturing of faces of the 3d elements and/or the digital terrain model; lighting.

In detail, the rendering may be based on a number of influencing factors: for example, the virtual camera position may be defined with respect to a current position of a user of the map viewer, e.g., as determined by a vehicle navigation unit. In such a manner it may be possible that the 3d map view relates to a bird's eye view of, e.g., a vehicle in which the map viewer is located. The vehicle may be followed by the 3d map view.

For example, it may be possible that the 3d elements of the various data layers contain additional attributes or indicators, e.g., assigned to the entire 3d element and/or individual faces thereof. Then it may be possible that a selected specific data layer is used only partially or fully for said rendering. For example, it may be possible that certain 3d elements and/or faces of the digital terrain model and/or the 3d road elements are excluded or included in said rendering, based on the respectively assigned attributes and/or indicators.

For example, the processor may be configured to repeatedly render the 3d map view, e.g., using a predefined refresh rate. Likewise, the processor may be configured to repeatedly select the specific data layers. In a simple scenario, the processor may combine 3d elements of all selected layers and render them together in a single run.

It is also possible that the processor is configured to individually render the data of the selected specific data layers and to subsequently overlay the individually rendered data to obtain the 3d map view.

I.e., the processor may be configured to render, one at a time, the 3d elements of the selected specific data layers and subsequently overlay the individually rendered 3d elements present, e.g., in the form of a pixel picture of the selected specific data layers to obtain the 3d map view.

For example, the processor may be configured to execute the following steps in sequence when rendering the 3d map view: selectively render the graphical representation of the digital terrain model based on the data layer of the digital terrain model, i.e., if that data layer is selected; and selectively render the graphical representation of the 3d road network based on the data layer of the 3d road network, i.e., if that data layer is selected; and selectively overlay the rendered graphical representation of the 3d road network onto the rendered graphical representation of the digital terrain model.

For example, in such a manner a reduced computational effort for said rendering may be achieved. Some layers may be deliberately excluded from said rendering to reduce the required computational resources. Also, this may be true for a given level of detail if compared to the solution where the entire 3d geographical map is stored in a single layer which is integrally rendered. Besides the increased flexibility in said rendering, furthermore, the need for computational resources may be relaxed.

The digital terrain model (DTM) can, e.g., specify an elevation of a certain geographical position over a reference height, for example as defined in the WGS 84 system. In other words, the DTM may define surfaces of the geography for a certain area. Different data formats for storing the DTM as the respective data layer of the database are known to the skilled person. Therefore, details need not be discussed in this context.

The 3d road elements may relate to conventional 3d elements, e.g., as defined by a wireframe model. Such a wireframe model may define the edges of the 3d road elements. In other words, the 3d road elements may be fully three-dimensional objects in the sense that they have defined extensions in all three spatial dimensions (height, width, depth). In particular, this may be distinct from the conventional representation of a road network as a graph consisting of vertices and edges—namely, such a representation using a two-dimensional graph may not assign a 3d dimension to the individual road segments. Rather, the graphical representation may be flat and merely contain a width. Complex structures such as junctions or bridges may not or only to a limited degree be displayed.

The resolution setting of the 3d map view may relate to and/or depend on various parameters. Such parameters may be selected from the group comprising: current magnification setting, a current position, a current road segment on which a vehicle in which the map viewer is located is travelling, predefined rules. For example, depending on the current position, e.g., of the vehicle in which the map viewer is located, a specific resolution setting may be determined (e.g., from a look-up table and/or using preconfigured rules and/or from a threshold comparison). The same applies to the current road segment. In the following, various example scenarios are presented which, however, may not be construed as being limiting. For example, if the current position or, respectively, the current road segment is located within a tunnel, a specific resolution setting of the 3d map view may apply; for example, in such a scenario only the data layer of the 3d road network may be selected and the data layer of the digital terrain model may be excluded from the rendering. Furthermore, other data layers, e.g., of vegetation etc., may also be excluded from the rendering. In such a way, it may be possible to obtain an unobscured and free view on, e.g., a vehicle model located at the current position. In particular, 3d elements being part of the excluded data layer(s) may not obstruct the view. This may allow for an easier orientation and therefore safe navigation and high recognition value of the 3d map view. A further scenario would be that the resolution setting is determined based on a received current magnification setting of the 3d map view. For example, large (small) magnification may relate to a larger number (a smaller number) of data layers selected for being used in the rendering of the 3d map view. In such a manner, when a user of the map viewer zooms out of the 3d map view, it may be possible to selectively exclude specific data layer, e.g., step-by-step, from the rendering and thereby provide better orientation and overview due to the lower level detail included in the 3d map view. For example, if the 3d map view is rendered using a low magnification, it may be possible to select and use solely the data layer of the digital terrain model for the rendering. In particular, it may be possible to exclude the data layer of the 3d road network from the rendering. In yet another scenario, it may be possible that the resolution setting is associated with a preconfigured rule. For example, the preconfigured rule may specify that certain data layers are always selected and used for the rendering, while other data layers are always excluded from the rendering. In such a manner it may be possible to take into account design choices of, e.g., the user or a manufacturer of the map viewer. This may allow, in other words, for a large degree of personalization of the map viewer. As can be seen from the above, the resolution setting may relate to various parameters and may not be particular limited.

The optical output device may be a display, a head up display, a projector, or the like. It may be coupled with the processor. For example, the display may be part of a vehicle head unit if the map viewer is located in a vehicle.

For example, the data may further comprise separate data layers selected from the group comprising: a data layer of buildings and/or landmarks modelled by 3d models; a data layer of traffic lights and/or traffic signs; a data layer of public transportation; and a data layer of vegetation.

It may be possible to include separate data layers comprising a combination of these different elements or a different grouping. It may be possible to include a large or smaller number of data layers.

The 3d road elements of the data layer of the 3d road network may model a road surface and a height difference between the road surface and the terrain surface of the digital terrain model.

In other words, the 3d road elements may be 3d elements located at a position on top of the terrain surface. Independently of this positioning of the 3d road elements, the data layer of the digital terrain may be selected and used for the rendering or may be excluded from the rendering.

By modelling a height difference between the road surface, i.e., where vehicles can move on, and the terrain surface, a road may be modelled particularly well.

For example, the 3d road elements may model the road surface such that the road surface has smoother height variations if compared to the underlying terrain surface of the digital terrain model.

In other words, the terrain surface may have a stronger dependency on the position than the road surfaces located at the same positions, e.g., above or beneath the respective terrain surface. In such a manner it may be possible to even out or smooth the road surface which may model real world roads in a particularly realistic manner. Moreover, the graphical representation of the 3d road network may be simplified and cause less distraction to the user. Also fewer graphical errors such as clipping may occur.

The data layer of the 3d road network may include indicators indicating faces of the 3d road elements corresponding to the road surface. The processor may further be configured to render the 3d map view using predefined textures for the road surface based on the indicators.

For example, the indicators indicating faces of the 3d road elements which correspond to a road surface may relate to attributes assigned to the respective faces of the 3d raw data such as a wireframe model. Sometimes such data may be referred to as meta-data as it may be used to configure and/or optimize the rendering of the 3d map view accordingly. For example, the predefined textures used for the road surface may be selected when the respective indicator equals a "true" value. The road surface texture may visualize driving lanes, crossings, intersections, turning lanes, etc. Of course it may be possible to include a respective amount of information in the indicators, e.g., by allowing more than 2 states.

The 3d road elements may further comprise elements selected from the group comprising: ramps connecting the road surface of a particular 3d road element elevated above the terrain surface of the digital terrain model with the terrain surface of the digital terrain model; bridges; street sidewalks.

For example the indicators may identify and reference such elements. It may further be possible that not all or only some of the 3d road elements include the indicators indicating the road surface. For example, the indicators may only be included for such faces which relate to road surfaces on which motorized vehicles are permitted to drive. For example, in such a scenario street sidewalks or passenger bridges may not include the respective indicators—or may include respective indicators indicating that no road surface is present. On the other hand, for example the ramps connecting the road surface and the terrain surface may include indicators indicating the road surface.

The ramps may, in other words, serve as connecting elements between the terrain surface and the road surface. For example, the ramps may enable a smooth transition between the 3d road network of the 3d map view and a conventional graph-based 2d road network as mentioned above. Such a scenario may occur when the 3d road network has limited geographical extents: Typically, the high level of detail associated with the 3d road network and the 3d geographical map, respectively, is only provided for certain areas of denser population or of particular importance. This may be due to restrictions imposed by the large amount of memory required for such 3d representation of the environment, as well as by the large efforts and costs necessary to prepare such 3d geographical maps. Then, in particular in situations where the transition between the 3d geographical map and a conventional graph-based representation of the environment is present, i.e. at the edges of the 3d geographical map, a continuous or smooth transition may be desired. In a case where the road element models a height difference between the road surface and the terrain surface, ramps may be used in order to enable a smooth transition of the road surface between the 3d road elements and the graph-based 2d road elements.

The processor may be configured to render the 3d map view such that it includes a graphical representation of a planned route obtained from a navigation unit, the graphical representation of the planned route being indicated for the road surfaces of the road elements.

For example, the navigation unit may be part of the map viewer or may be a separate unit coupled to the map viewer. The planned route may be indicated using a suited graphical representation, e.g. comprising arrows, lines, and/or characteristic colours, etc. In order to provide an intuitive graphical representation of the planned route, it may be desirable to only indicate the planned route for faces of the 3d road elements which are road surfaces. They may be identified by the respective indicators as set forth above.

In particular, by providing the above-mentioned ramps and the smooth road surface together with the indicators indicating the road surface, discontinuities of the graphical representation of the planned route, e.g., height jumps, sharp bends, or kinks, may be avoided in the 3d map view.

The data may further include two-dimensional (2d) textures at least for the data layers of the digital terrain model and the 3d road network. The processor may be configured to select particular 2d textures for the terrain surface and/or the 3d road elements depending on a mode of operation and to render the 3d map view using the selected 2d textures for the respective terrain surface and/or the respective 3d road elements.

For example, the mode of operation may be predefined by a user or a manufacturer of the map viewer or may be determined based on current properties of the 3d map view, e.g., the magnification, the current position, the current road segment, the virtual camera position, and/or the resolution setting etc. It may also be possible to determine the mode of operation based on other parameters such as a time of the day and/or environmental brightness. For example, it may be possible to provide a user interface which allows a user of the map viewer to select a mode of operation which specifies the respectively used 2d textures. For example, the mode of operation may relate to a coloring scheme.

Textures may relate to 2d graphics which are tiled onto a surface of a 3d element. By including specific 2d textures for faces of the DTM and/or the 3d road network, it may be possible to blend in the 3d map view with surrounding regions where no data of the 3d geographical map is available. As indicated above, typically the 3d geographical map is only available for geographical regions of limited extent. By separately providing the 2d textures and using them for said rendering, it may be possible to match textures used for the 3d map view and the surrounding regions. For example, one and the same texture may be used for the landscape surface or rivers and lakes, etc.

The digital terrain model may further include road tunnels. Road tunnels may refer to underground structures which comprise or house a road. By including the raw data for the road tunnels in the data layer of the DTM—e.g., instead of in the data layer of the 3d road network—it may be possible to advantageously execute said rendering. For example, it may be possible to select and fully use the data layer of the 3d road network in said rendering and only partially include the faces of the respective DTM. It is also possible that the DTM data layer is not selected and used for said rendering. This may allow an unobstructed view on the road located inside a tunnel. Other variations are possible.

The data layer of the digital terrain model may include indicators indicating faces of the digital terrain model selected from the group comprising: a side wall of the tunnel; a ceiling of the tunnel; a floor of the tunnel; a terrain surface located above the ceiling of the tunnel; a tunnel portal. A 3d road element of the 3d road network data layer may be located on the floor of the tunnel.

As set forth above with respect to the indicators indicating the road surface in the data layer of the 3d road network, the indicators of the DTM data layer may be referred to as meta-data as well. When rendering the respective DTM data layer, based on these indicators certain faces may be included or excluded from said rendering: The processor may be further configured to select particular faces of the digital terrain model based on the indicators and to exclude the selected particular faces from the rendering of the 3d map view.

For example, the following scenario may occur: a vehicle in which the map viewer is located travels through a tunnel. The 3d map view is rendered by selecting and using both the data layer of the DTM and the data layer of the 3d road network. All faces of the data layer of the 3d road network are rendered and are therefore, in principle, visible in the 3d map view. However, in order to provide an unobstructed view of the respective roads, only a fraction of the faces of the DTM is used for rendering. For example, the processor may be configured to select the floor of the tunnel and the left-hand side wall of the tunnel for rendering, but exclude from the rendering the roof of the tunnel, the right-hand side of the tunnel and the terrain surface located above the roof of the tunnel. If the virtual camera position used for the rendering is located behind and above the vehicle, it may therefore be possible to provide an unobstructed view onto the vehicle by excluding the above-mentioned faces of the DTM from the rendering. This example is detailed for illustrative purposes only and shall not be construed as being limiting.

According to a further aspect, a method of displaying a 3d map view of a 3d geographical map is provided. The method comprises retrieving data which defines the 3d geographical map from a database, wherein the retrieved data is stored in the database in a layered hierarchy comprising data layers which can be individually rendered for a 3d map view. The retrieved data comprises at least a data layer of a digital terrain model which is modelling a terrain surface and a data layer of a 3d road network comprising 3d road elements. The method further comprises, in a processor, selecting specific data layers of the retrieved data in response to a resolution setting of the 3d map view and rendering the 3d map view using the selected specific data layers of the retrieved data. The method further comprises displaying the rendered 3d map view on a display.

For such a method of displaying the 3d geographical map, effects may be obtained, which are comparable to the effects which can be obtained with the map viewer according to a further aspect.

According to a further aspect, a method of generating a database storing data which defines a 3d geographical map is provided. The method comprises receiving digital map data, wherein the digital map data comprises a digital terrain model which is modelling a terrain surface and a 3d road network comprising 3d road elements. The method further comprises storing in the database in a first data layer the data of the digital terrain model. The method further comprises storing in the database in a second data layer the data of the 3d road network. The data layers can be individually rendered in a 3d map view.

For example, the database generated using the method of generating a database according to the presently discussed aspect may be employed for executing the method of displaying a 3d geographical map view according to a further aspect.

It is to be understood that the features mentioned above and those yet to be explained below may be used not only in the respective combinations indicated, but also in other combinations or in isolation without departing from the scope of the invention. For example, it may be possible to use features explained above in connection with the map viewer also with respect to the further aspect of the method of displaying the 3d geographical map. Respective features may be used for the further aspect of the method of generating the database storing the data which defines the 3d geographical map.

BRIEF DESCRIPTION OF THE DRAWINGS

In the following, the invention will be explained in further detail with respect to embodiments illustrated in the accompanying drawings.

FIG. 9A shows a 3d map view of a tunnel.

FIG. 9B is the 3d map view of the tunnel of FIG. 9A where some faces of a digital terrain model have been excluded from the rendering.

FIG. 10 schematically illustrates the 3d map view of the tunnel of FIG. 9A in further detail in a side view.

DETAILED DESCRIPTION

Figure 1:
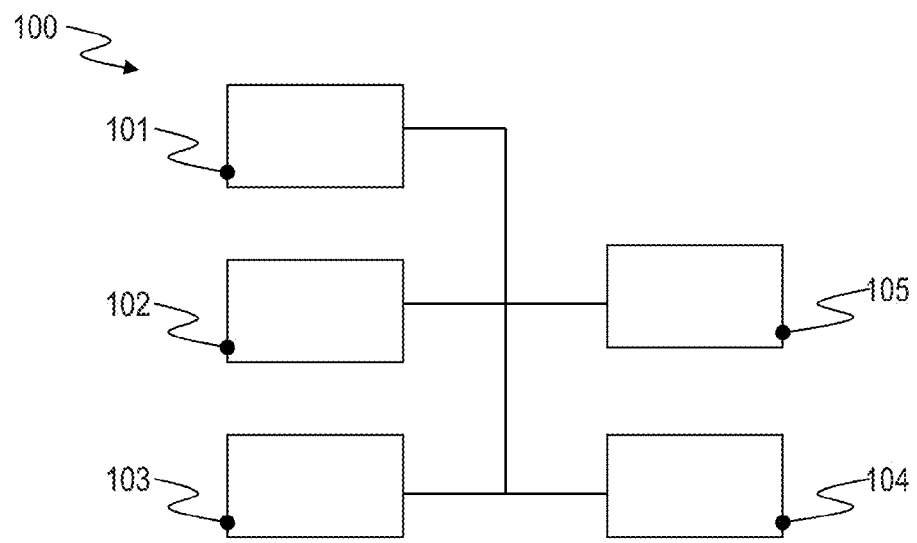
FIG. 1 is a schematic illustration of a map viewer comprising a database storing data which defines a 3d geographical map in a layered hierarchy, according to various embodiments.

The foregoing and additional features and effects of the invention will become apparent from the following detailed description when read in conjunction with the accompanying drawings, in which like reference numerals refer to like elements.

In the Figures, techniques for displaying a 3d map view are illustrated. In particular, the 3d map view visualizes a fully three-dimensional geographical map which therefore includes only or to a large degree 3d elements such as a DTM and a 3d road network. In particular, the 3d map view is distinct to conventional map views in that the roads are full-scale 3d elements which extend in all three spatial dimensions, i.e., have associated height, width, and depth. In contrast, in conventional map views the roads may be obtained from a 2d graph consisting of vertices and edges. The graphical representation of the road network may comprise a width of each road, e.g., depending on a road hierarchy class such as local road, highway, freeway—yet, the roads are typically merely overlaid on the terrain surface of the DTM and do not comprise height and depth dimensions. While such a 2d graph of the road network may find particular application in the calculation of optimized routes and map views of low detail, it may be less suited to graphically represent more complex road structures, e.g., bridges, multi-lane junctions, etc.

FIG. 1 is a schematic illustration of a map viewer 100 for displaying a 3d geographical map. For example, the map viewer 100 may be employed in and located in a motorized vehicle. The map viewer 100 comprises a database 101 which stores data defining the 3d geographical map. The database 101 is coupled to a processor 102 which is configured to receive the data from the database and, based on the data, render a 3d map view being a graphical representation of the 3d geographical map. The processor 102 is coupled to a display 103 such that the rendered 3d map view can be displayed on the display 103. For example, the rendering may occur using a given refresh rate. Furthermore, the map viewer 100 comprises a navigation unit 104 which is configured for calculating an optimized route with respect to certain constraints, such as shortest travel distance, shortest travel time, and/or lowest energy consumption. Furthermore, the navigation unit 104 can provide a current location of a vehicle in which the map viewer 100 is mounted. The current location can correspond to latitude and longitude geographical coordinates and/or match to a current road segment. Furthermore, the map viewer 100 comprises a user interface 105, which can comprise buttons etc., a voice interface, and/or gesture recognition systems. While in FIG. 1 the navigation unit 104 and the user interface 105 are shown as being part of the map viewer 100, it should be understood that these units 104, 105 can also be separate units and that the map viewer 100 can comprise specific interfaces for communicating with such units.

The elements of FIG. 1 can be implemented as separate physical units or may be implemented as software code executed on a processor. Combinations of hardware and software solutions are possible.

Figure 2:
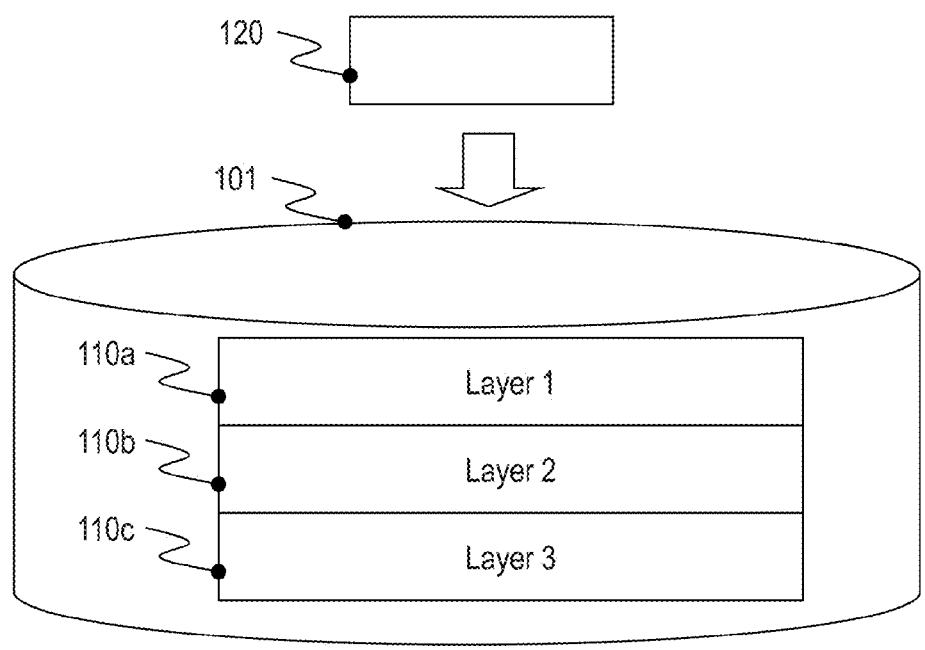
FIG. 2 illustrates the layered hierarchy of the database of FIG. 1 in further detail.

In the following, details of the database 101 are explained. The database 101 stores the data defining the 3d geographical map in a layered hierarchy, i.e., comprising data layers. In particular, the data comprised in the various data layers can be individually rendered by the processor. This layered hierarchy is further illustrated in FIG. 2, which is a schematic illustration of the database 101 in greater detail. In particular, as can be seen from FIG. 2, the database 101 comprises three data layers 110a, 110b, 110c, which correspond to a digital terrain model (DTM) for the data layer 110a, a 3d road network for the data layer 110b, and buildings and/or landmarks for the data layer 110c, respectively. When generating the database 101, digital map data 120 is received and distributed across these layers 110a, 110b, 110c. Because each layer 110a, 110b, 110c comprises sufficient data to individually, i.e., independently, render the contained data, it is possible that the processor 102 individually renders the data of each or a subfraction of the layers 110a, 110b, 110c and subsequently overlays the independently rendered data to obtain the 3d map view.

Figure 3:
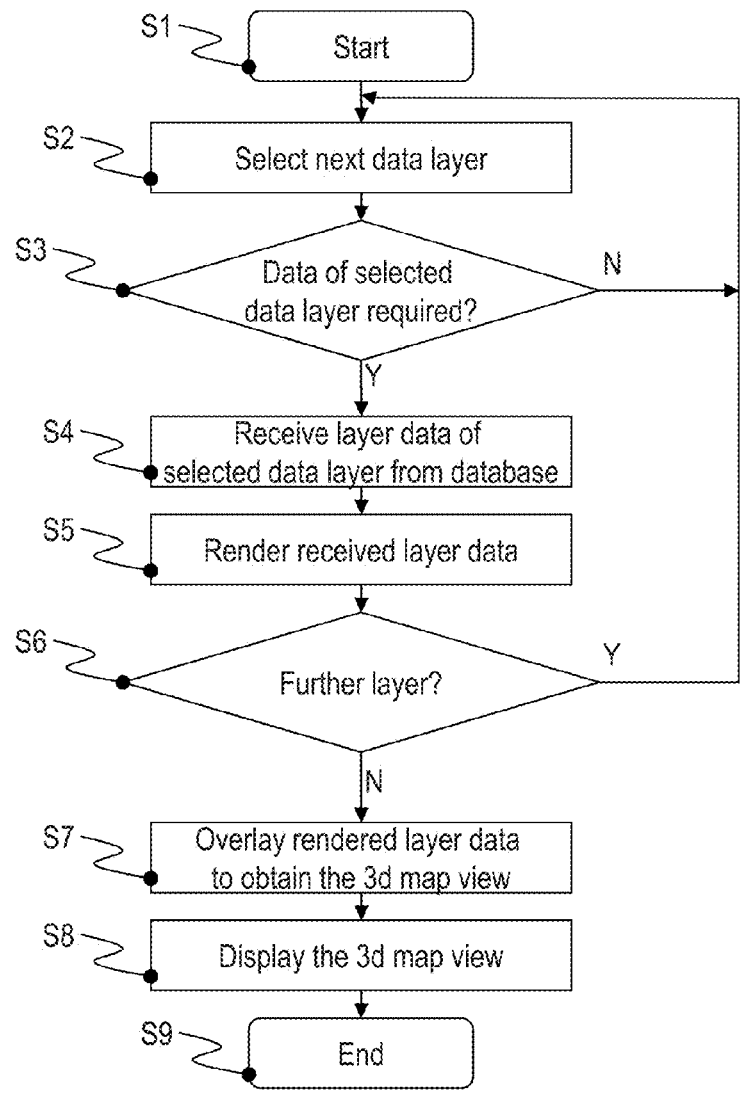
FIG. 3 is a flowchart of a method of displaying a 3d map view of the 3d geographical map.

In FIG. 3, a respective method of displaying a 3d map view of a 3d geographical map is illustrated a flowchart.

The methods starts in step S1 and in step S2 a specific data layer 110a, 110b, 110c or the database 101 is selected. In step S3, it is checked whether this selected data layer 110a, 110b, 110c is indeed required. The decision in step S3 is based on the resolution setting of the 3d map view. For example, the resolution setting may relate to a current magnification level of the 3d map view, preconfigured rules, and/or a virtual camera position. However, other parameters may influence the desired level of resolution for the 3d map view. Generally, a higher (smaller) level of resolution may correspond to a larger (smaller) number of data layers selected for rendering in step S3 of FIG. 3—yet other dependencies are possible.

For example, if in step S2, the DTM data layer 110a (cf. FIG. 2) is selected, in step S3 it may be decided that this specific data layer is required. Then, in step S4, the layer data of the specific and currently selected data layer is received from the database 101, e.g., via a suited wired or wireless data connection.

Next, in step S5, the received layer data is rendered by the processor 102. In step S6, it is checked whether a further layer exists. If so, steps S2-S5 are executed anew. Otherwise, all previously rendered layer data, i.e. from multiple executions of step S5, are overlaid to obtain the 3d map view (step S7). The rendered layer data can correspond to a pixel image where some pixels have a transparency assigned such that when overlaying the rendered pixel images, lower pixel images can be partly visible. In step S8, this 3d map view is displayed, e.g., on the display 103, and the method ends in step S9.

Figure 4:
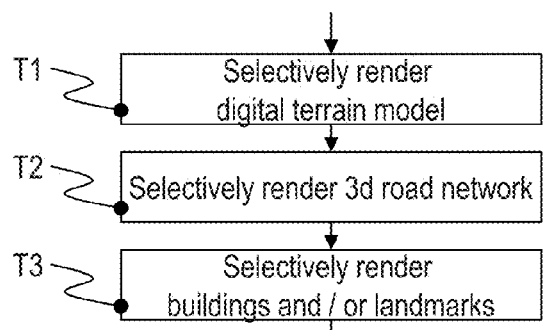
FIG. 4 is a flowchart illustrating steps of FIG. 3 in greater detail.

The individual or independent rendering of the various layer data, i.e. the multiple executions of step S5, are further illustrated in the flowchart of FIG. 4. From FIG. 4 it can be seen that, e.g., initially the DTM is selectively rendered. The selective rendering corresponds to the decision making in step S3 of FIG. 3 as explained above. Subsequently, the 3d road network of the data layer 110b of the database 101 is selectively rendered in step T2 of FIG. 4. Subsequently, further layers are selectively rendered in step T3, e.g., the data layer 110c corresponding to buildings and/or POIs. From each of the steps T1-T3, a 2d pixel image may be obtained which is suited for optical output on the display 103. In step S7 of FIG. 3 these 2d pixel images may be overlaid to obtain the final 3d map view.

It should be understood that a larger or smaller amount of data layers 110a, 110b, 110c can be included in said rendering of step S5 of FIG. 3 and the database 101 respectively. For example, it is possible that the database 101 comprises separate data layers of buildings and/or landmarks modelled by 3d models, of traffic lights and/or traffic signs, of public transportation, such as railways, railway crossings, railway tracks, etc., and/or data layers of vegetation, such as trees etc. It should be understood that this listing is non-exhaustive and further data layers are possible, in particular depending on the level of detail and storage amount available from the database 101.

Figure 5:
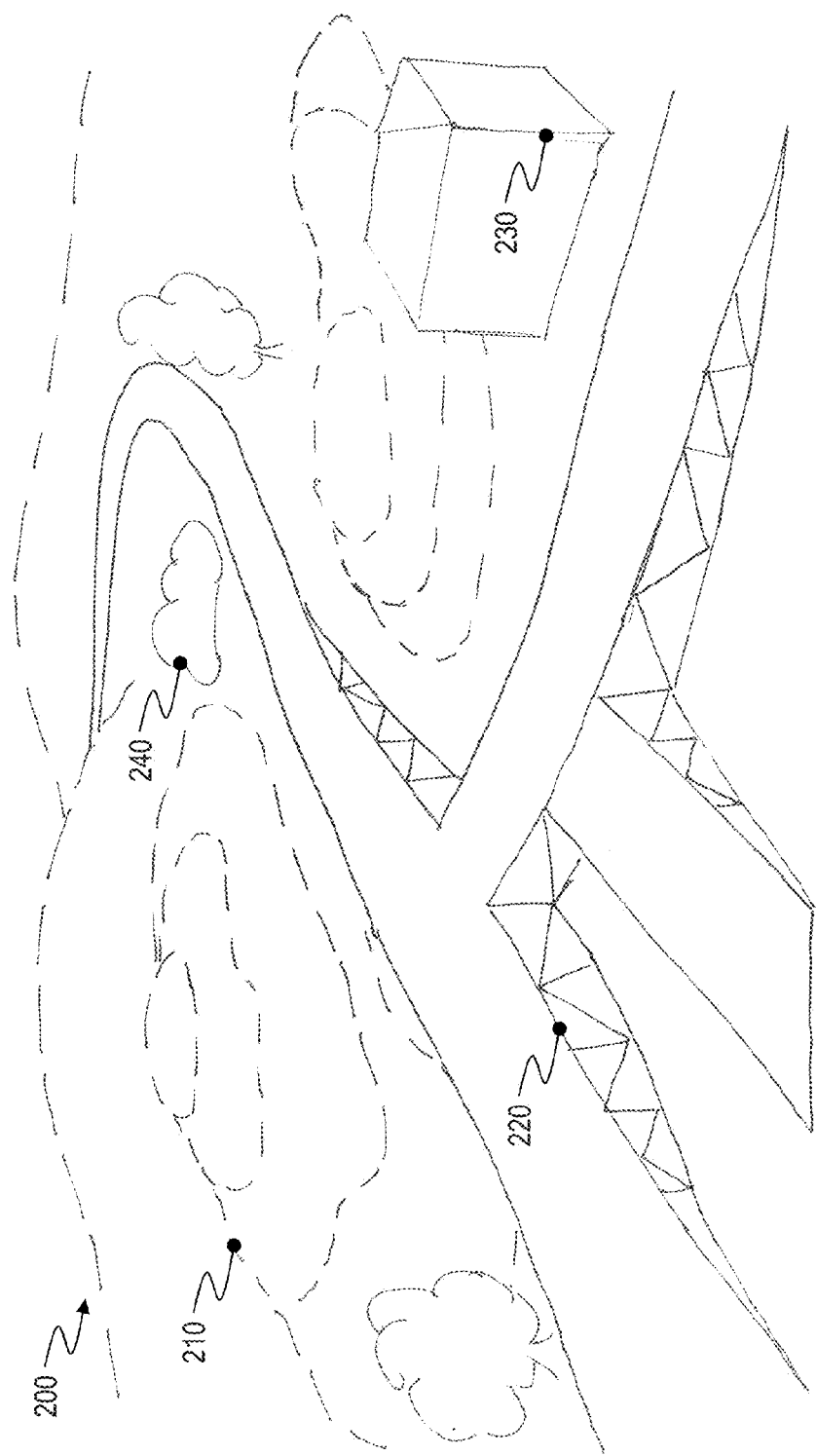
FIG. 5 shows a 3d map view, wherein the 3d map view includes a graphical representation of a terrain model and of a 3d road network and of buildings and of vegetation.

In FIG. 5, a 3d map view 200 is depicted. The 3d map view 200 graphically represents a 3d road network 220, a DTM 210, vegetation 240, and houses, buildings, and POIs 230.

For example, the data relating to the digital terrain model 210 may be obtained from said rendering of the DTM data layer 110a of the database 101. Respectively, a graphical representation of the 3d road network 220 may be obtained from said rendering of the respective data layer 110b of the database 101. Respectively, the graphical representation of the buildings and/or POIs 230 may be obtained from said rendering of the data layer 110c of the database 101.

As set forth above, it is possible to select and use specific data layers 110a, 110b, 110c for said rendering. For example, in FIG. 6 a situation is shown, where for said rendering of the 3d map view 200, the data layer 110c of the buildings and/or POIs 230, as well as the data layer of the vegetation 240 has not been selected for said rendering. Consequently, in the 3d map view 200 of FIG. 6 the respective elements are not visible. This can also be seen from a comparison of FIGS. 5 and 6.

Figure 7:
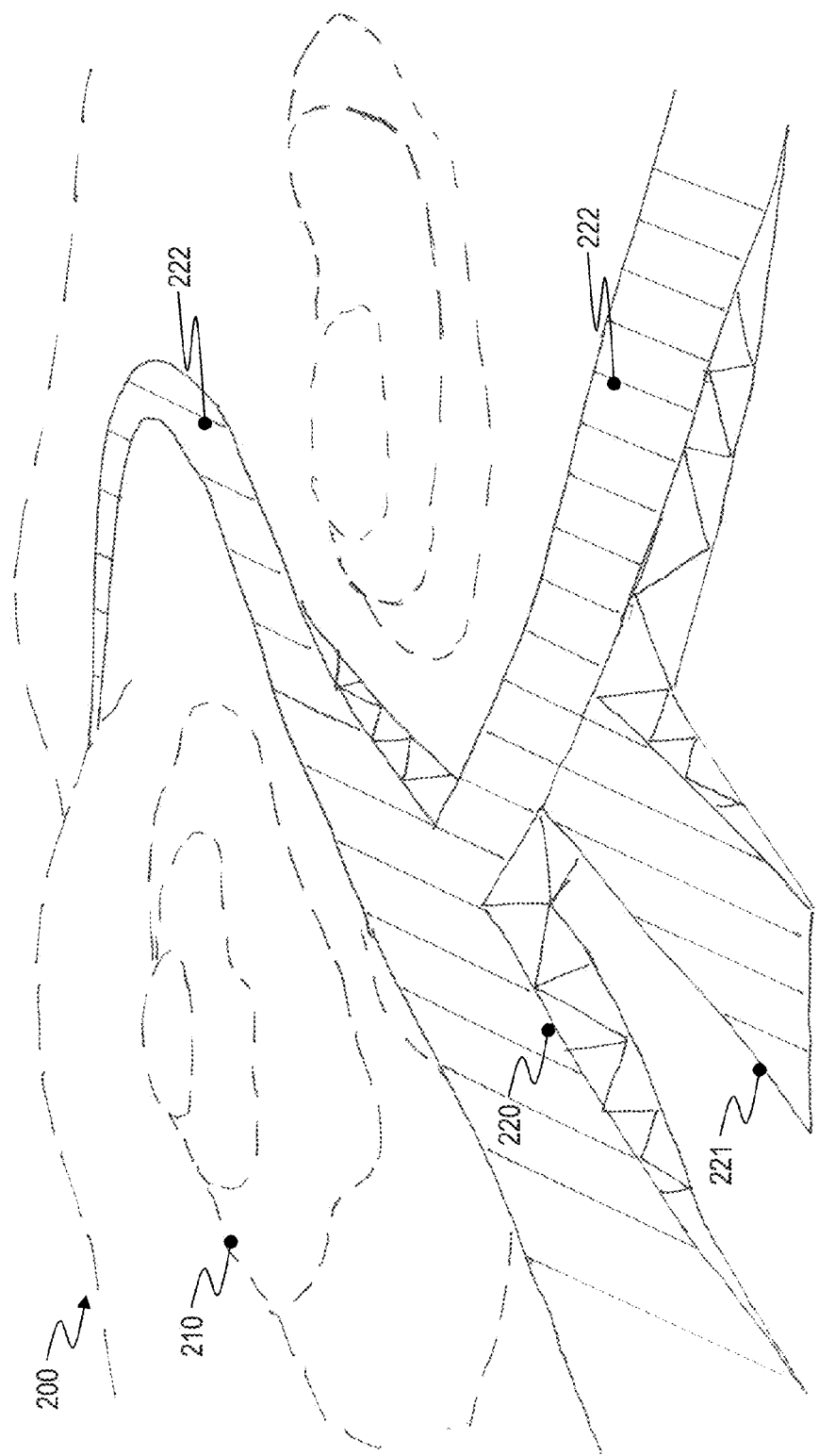
FIG. 7 shows the 3d map view of FIG. 6 where a road surface of the 3d road network is highlighted.

Turning to FIG. 7, details of the 3d road network of the data layer 110b of the database 101 are discussed with respect to the 3d map view 200.

In FIG. 7, a road surface 222 of the 3d road network 220 is highlighted using a dashed filling. As can be seen from FIG. 7, a height difference exists between the road surface 222 and the terrain surface. In FIG. 7, this height difference is illustrated by the meshing or gridding of the 3d road elements of the 3d road network 220. This height difference between the road surface 222 and the terrain surface varies for various positions along the 3d road network. In particular, this height difference can be employed in order to smooth the road surface 222 if compared to the underlying terrain surface of the digital terrain model 200.

The 3d road network 220 can comprise ramps 221, which connect the road surface 222 of a particular 3d road element which is elevated above the terrain surface with the terrain surface of the digital terrain model. As can be seen from FIG. 7, the ramp 221 provides a continuous connection between the terrain surface to the road surface 222 of the respective 3d road element. Such a continuous connection can be in particular useful at the outer boundaries of the 3d geographical map, where a transition between 3d road elements and conventional 2d road elements derived from a 2d graph consisting of vertices and edges may be desired. Because typically such 2d road elements derived from a 2d graph do not comprise an elevation or height difference against the underlying terrain surface, the ramps 221 may be used in order to ensure a smooth transition.

Figure 6:
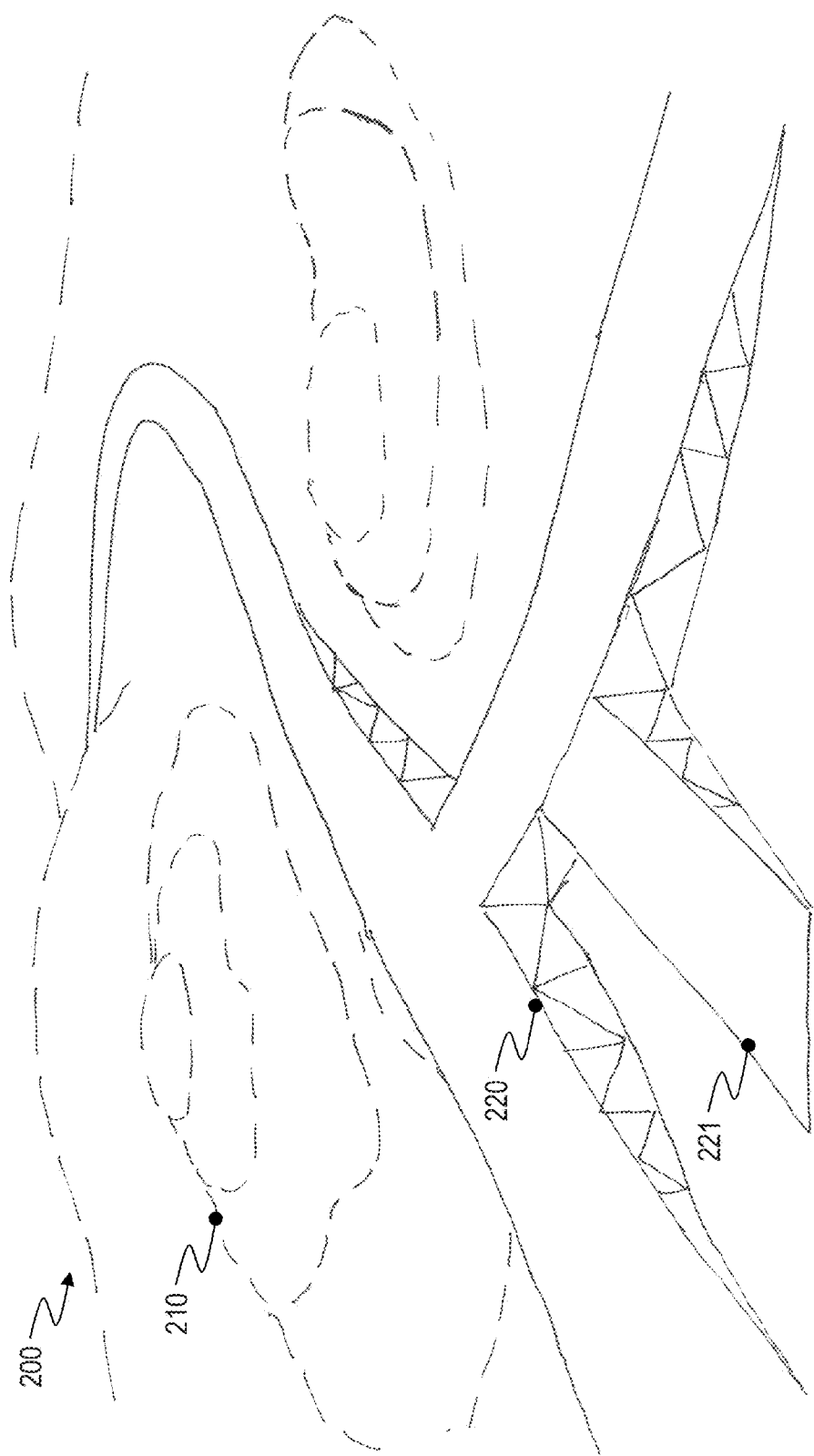
FIG. 6 shows the 3d map view of FIG. 5 where data layers of buildings and vegetation are excluded from the rendering.
Figure 8:
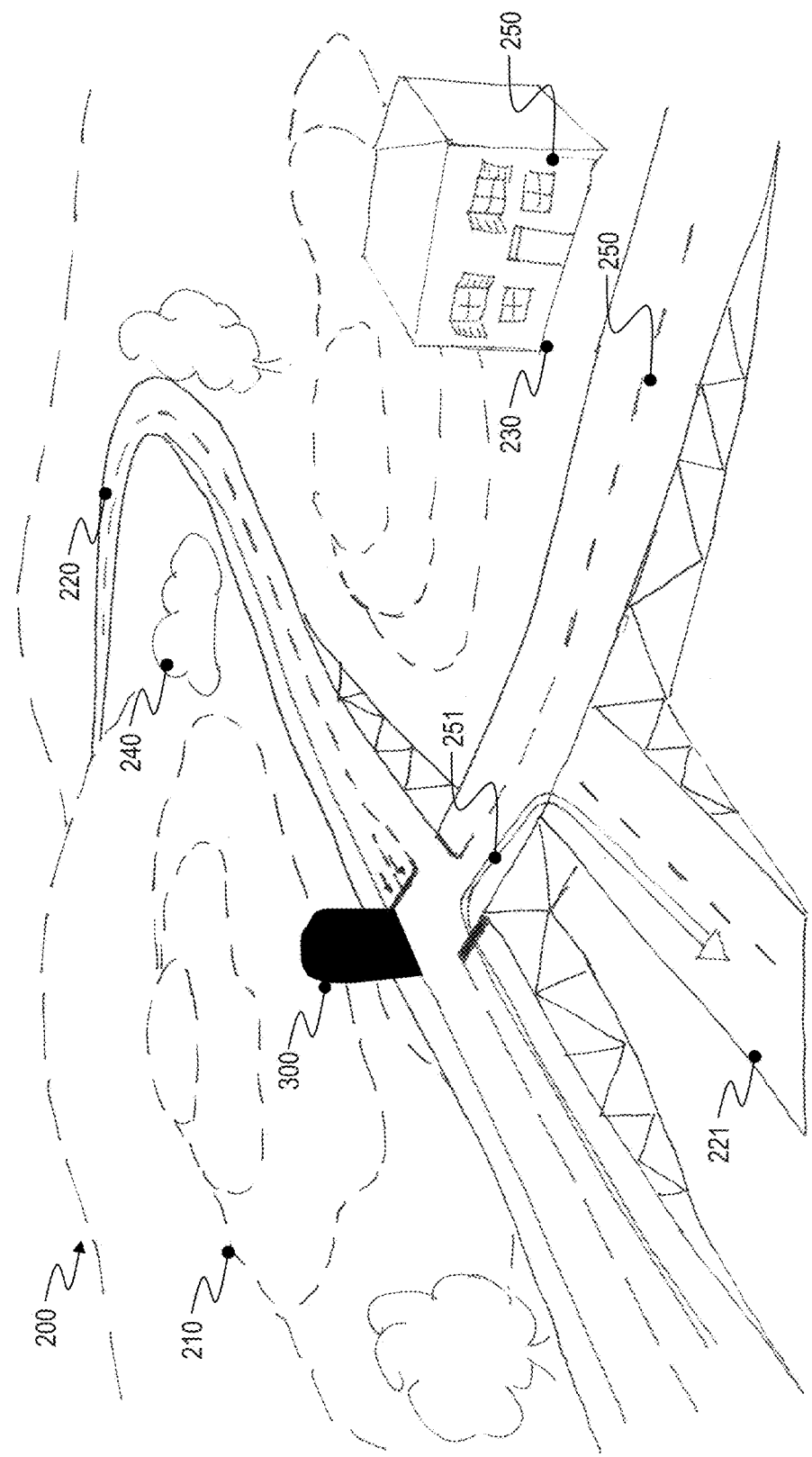
FIG. 8 shows the 3d map view of FIG. 5 where furthermore textures have been included.

Turning to FIG. 8, there a similar situation as in the preceding FIGS. 5-7 is depicted. Furthermore, the road surface 222 is provided with textures 250. For example, in order to provide the road surface 222 with textures, it is possible that the data layer 110b of the database 101 comprises indicators indicating faces of the 3d road elements which correspond to the road surface 222. Then it is possible to specifically texture the faces of the 3d road elements which correspond to the road surface 222. However, it should be understood that in general it is possible to perform any specific rendering operation based on these indicators beyond texturing; for example it may be possible to selectably include or exclude the faces corresponding to the road surface 222 from said rendering.

In FIG. 8, texturing 250 is further provided for the buildings/POIs 230. In FIG. 8, furthermore, a graphical indication of a planned route 251 as obtained from the navigation unit 104 of the map viewer 100 is graphically indicated. In particular, the graphical indication of the planned route 251 is arranged on the road surface 222 of the 3d road network 220. As mentioned above, the road surface 222 has comparably smooth height variations because it includes a height difference against the terrain surface of the DTM 210. This ensures that the graphical indication of the planned route 251 has a continuous and uninterrupted and therefore realistic appearance in the 3d map view 200. This is particularly true for the section arranged on the road surface 222 of the ramp 221.

Furthermore, illustrated in FIG. 8 is a tunnel 300. For the tunnel 300, a situation can occur where the road surface 222 of a 3d road element is below the terrain surface of the DTM 210. Different techniques relating to the tunnels 300 in the 3d map views 200 are discussed below with reference to the FIGS. 9A, 9B, 10, 11A. First, turning to FIG. 9A, the tunnel 300 is illustrated in further detail. The tunnel 300 comprises a tunnel portal or entry 310, a tunnel ceiling 320, a left wall 321, a right wall 322, and a bottom 324. Arranged on the bottom 324 of the tunnel 300 is a 3d road element of the 3d road network 220.

By storing the various elements 310, 320, 321, 322, 324 of the tunnel 300 as part of the DTM data layer 110a, it is easily possible to, e.g., select only the data layer 110b of the 3d road network 220 for the rendering and thereby provide a less complex and clear 3d map view 200 which is not complicated by the graphical representation of the tunnel 300. In particular, thereby it may be avoided that the view on the 3d road network 220 is obstructed by the DTM 210. However, it should be understood that it is also possible to select and use the DTM 210 of the respective data layer 110a for said rendering. In such a scenario, the data layer 110a of the DTM 210 can include indicators which distinguish and indicate the different faces of the digital terrain model 210 which correspond to the side walls of the tunnel 321, 322, the ceiling of the tunnel 320, the floor of the tunnel 324 and terrain surface located above the ceiling of the tunnel. Based on such indicators, the processor 201 can select particular faces of the DTM 210 and exclude the selected particular faces from said the rendering. This is illustrated in FIG. 9B, where the tunnel 300 of FIG. 9A is shown with excluded, i.e. not rendered left side tunnel wall 321, tunnel ceiling 320, tunnel portal 310 and terrain surface located above the tunnel ceiling 320. The tunnel is, in other words, modelled by only graphically representing the parts of the tunnel interior. By excluding the faces of the DTM 210 which include the respective referencing indicators, it is possible to obtain an unobstructed view on the 3d road network 220 which runs through the tunnel 300.

In FIG. 10 a side view of the scenario as illustrated in FIGS. 9A and 9B is depicted. Illustrated in FIG. 10 is the terrain surface 212 above the tunnel ceiling 320, and, furthermore, vegetation 240 of the respective data layer of the database 101. For example, the processor 102 can be configured to select solely the data layer 110b of the 3d road network 220 when the navigation unit 104 signals that the current location or the current road segment is located within the tunnel 300. In another scenario, it is possible that the processor selects and uses for the rendering the data layers 110a, 110b of the DTM 210 and the 3d road network 220, but excludes from said rendering the data layer of the vegetation 240. In the latter case, it is possible that, as shown with respect to FIG. 9B, certain faces of the digital terrain model 210 are excluded from said rendering.

Figure 11A:
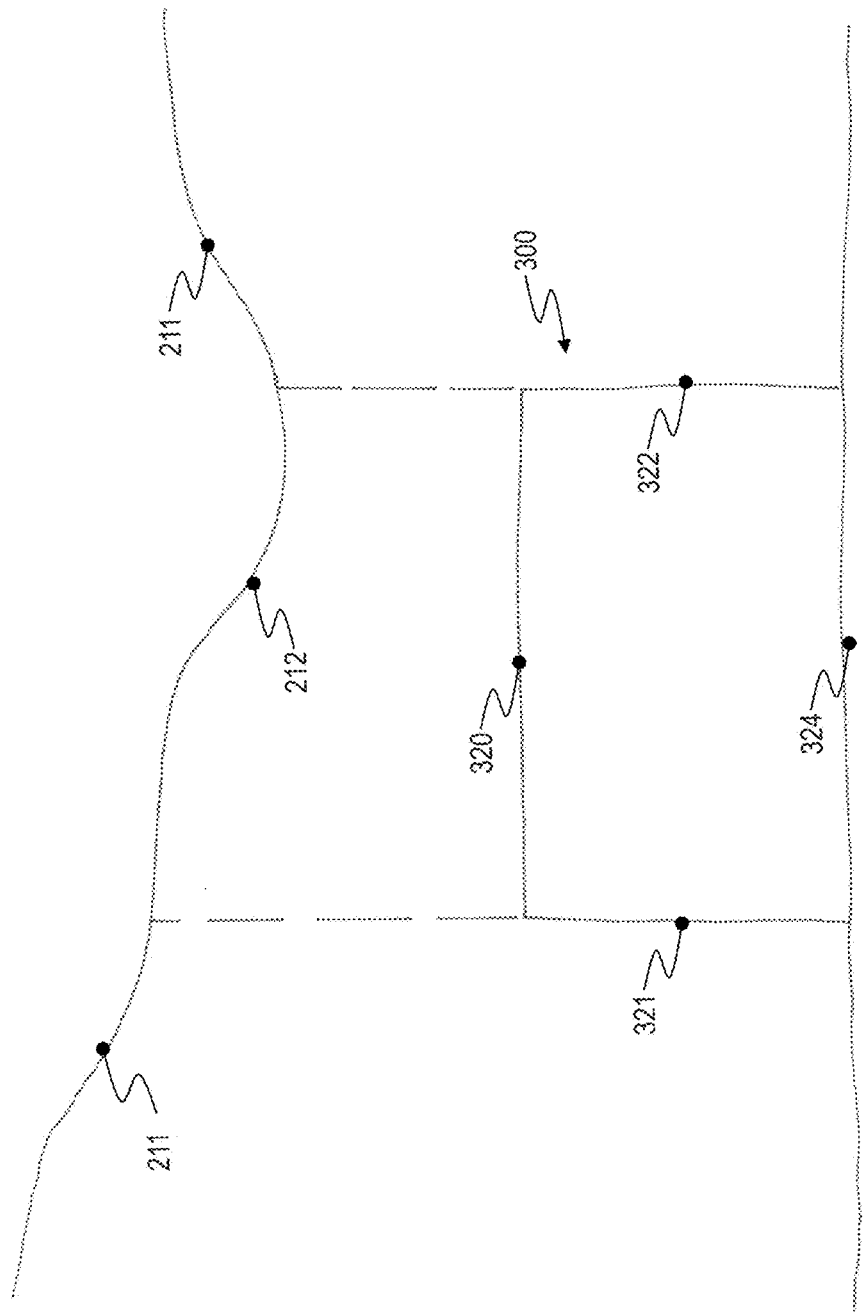
FIG. 11A schematically illustrates the 3d map view of the tunnel of FIG. 9A in further detail in a front view.

FIG. 11A is further view of the situation of FIGS. 9A and 9B. In FIG. 11A, a front view on the tunnel 300 is shown. Furthermore, in FIG. 11A, terrain surface 211, 212 is illustrated. In particular, it is distinguished between the terrain surface 211 which is not located above the tunnel ceiling 320, and the terrain surface 212 which is located above the tunnel ceiling 320. Respective indicators may be included in the data of the respective data layer 110a of the digital terrain model 210. While in FIG. 11A it is shown that the indicators only indicate the respective terrain surface 212 to be located directly above the tunnel ceiling 320 for a comparably restricted area, it is possible to set the indicators such that a larger area of terrain surface 212 is indicated. This may allow a less obstructed view to be obtained when the vehicle of the map viewer travels through a tunnel 300.

Figure 11B:
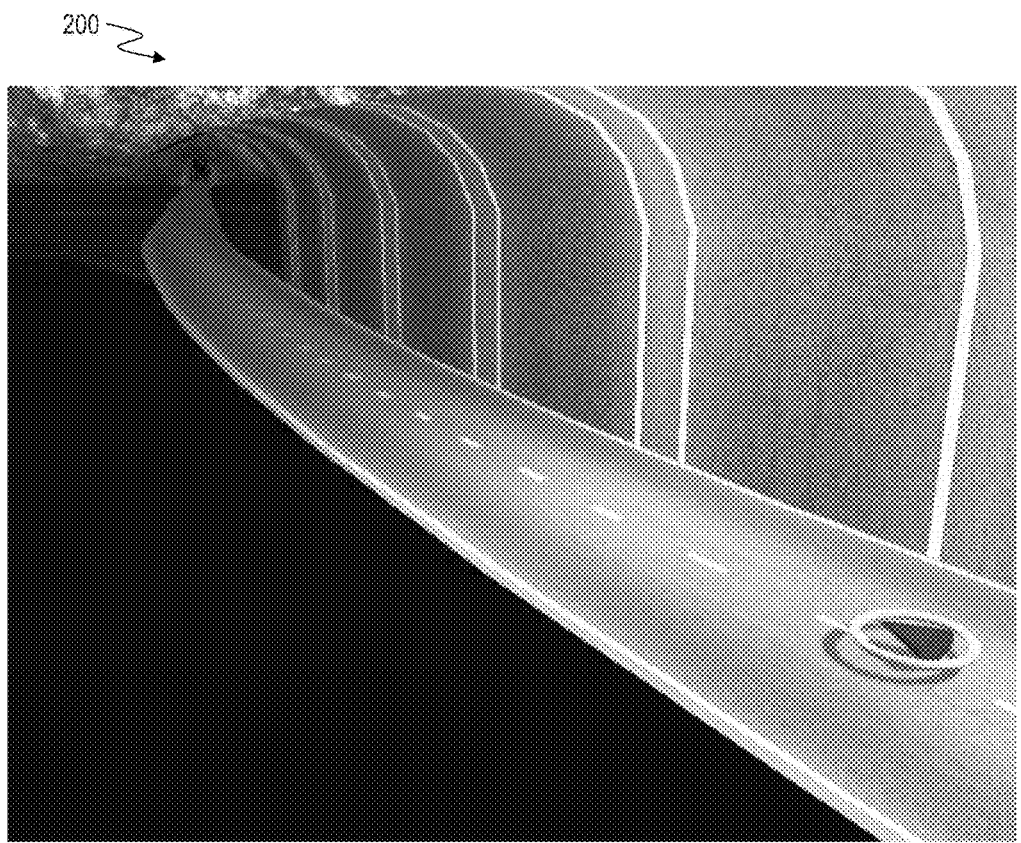
FIG. 11B illustrates the 3d map view of the tunnel of FIG. 9A in further detail in a perspective view.

In FIG. 11B, a perspective view of a comparable tunnel 300 is shown in a rendered 3d map view 200. In FIG. 11B, the tunnel 300 has a rounded ceiling 320. For example, it is possible to model the entire tunnel ceiling as being part of either the left or right side tunnel wall 321, 322 and using the respective indicators.

As can be further seen from FIG. 11B, the DTM 210 is not rendered. Only parts of the tunnel, e.g., the right side wall 322 and half the ceiling 320 are rendered.

Figure 11C:
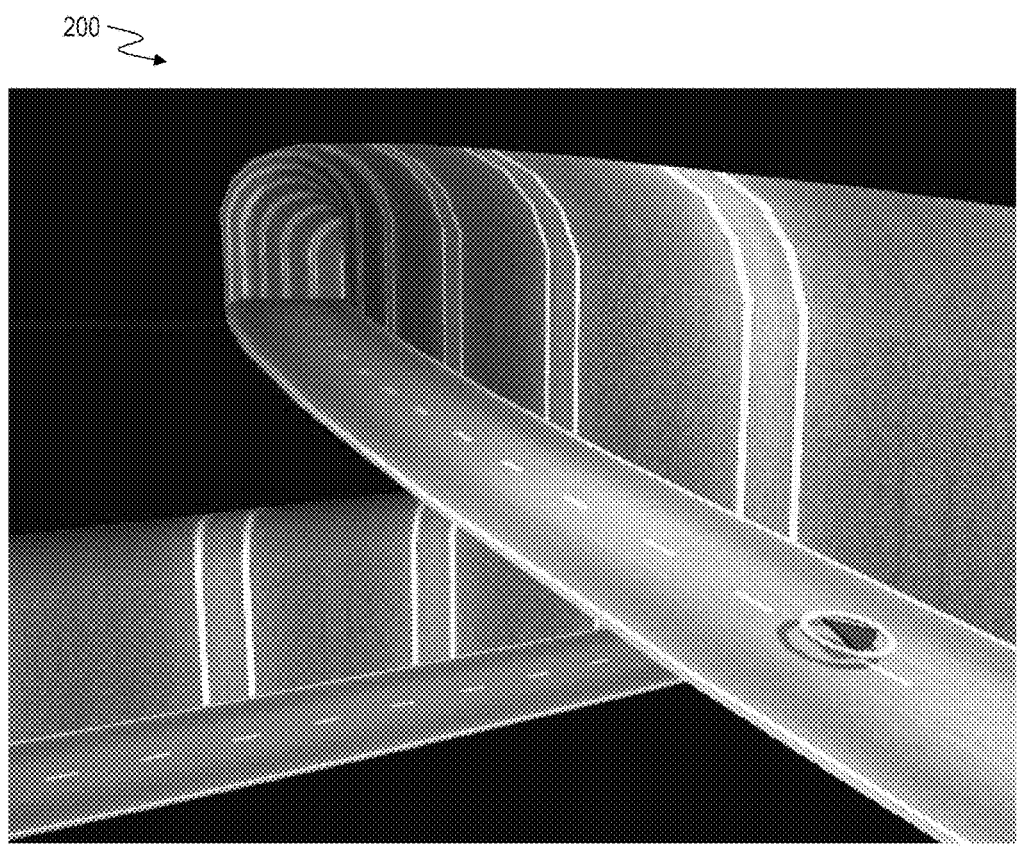
FIG. 11C illustrates the 3d map view of two tunnels in a perspective view.

As can be seen from FIG. 11C, such an approach also works well for a scenario where there a two intersecting tunnels 300 present in the 3d map view 200.

As exemplarily illustrated in FIG. 11C, it is possible to selectively exclude certain faces from said rendering based on a threshold comparison of a distance of the face to the virtual camera position; for example, if the distance is larger than a threshold, it is possible to include the respective faces in said rendering. In FIG. 11C, it can be seen that for larger distances to the virtual camera position also the left side tunnel wall is included in the rendering.

For example, the selectively excluding particular faces from said rendering based on indicators can be implemented in the OpenGL framework using the so-called backface technology.

Figure 12:
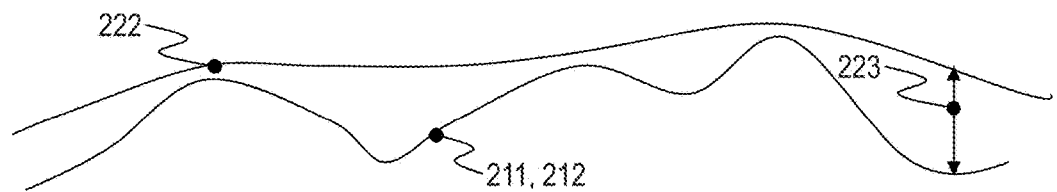
FIG. 12 schematically illustrates a height difference between the road surface of the 3d road network and the terrain surface and, furthermore, illustrates the smoothing of the road surface if compared to the terrain surface.

In FIG. 12, the smoother height variations of the road surface 222 if compared to the terrain surface 211, 212 is schematically illustrated. In particular, furthermore, a height difference 223 between the road surface and the terrain surface 211, 212 is indicated. For the tunnels 300, this height difference 223 may also become negative. As can be seen, a spatial dependency of the elevation of the road surface 222 is smaller than a spatial dependency of the elevation of the terrain surface 211, 212: this may refer to the smooth road surface 222. This allows the real-life road network to be modelled more realistically by means of the 3d road network 220 of the respective data layer 110b of the database 101.

Figure 13:
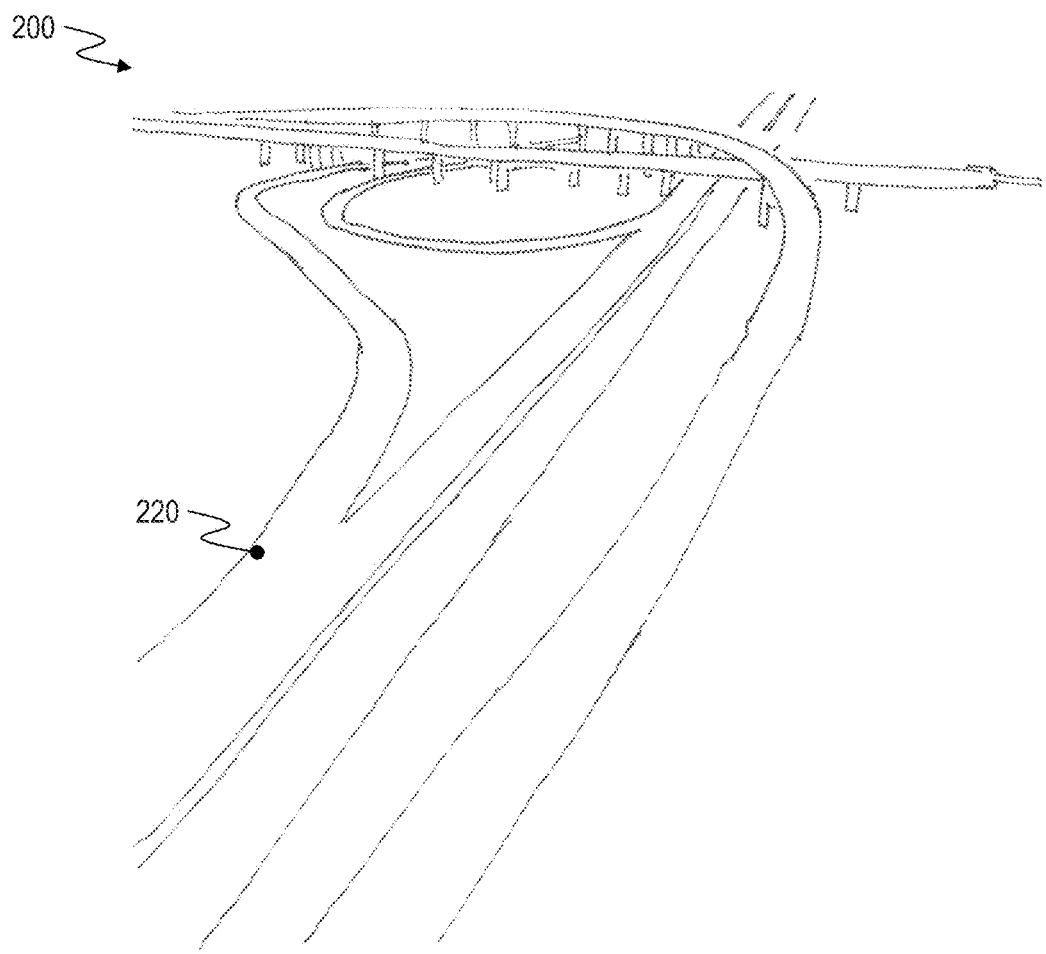
FIG. 13 shows a 3d map view where only a data layer of the 3d road network has been selected and used for the rendering.

Next, turning to FIG. 13, a 3d map view 200 is shown for which solely the data layer 110b of the database 101 of the 3d road network 220 has been selected and used for the rendering. As can be seen, only road structures are visible in the 3d map view 200. In particular, the underlying DTM 210 is not visible in FIG. 13. Also, other features are not visible in the 3d map view 200.

Figure 14:
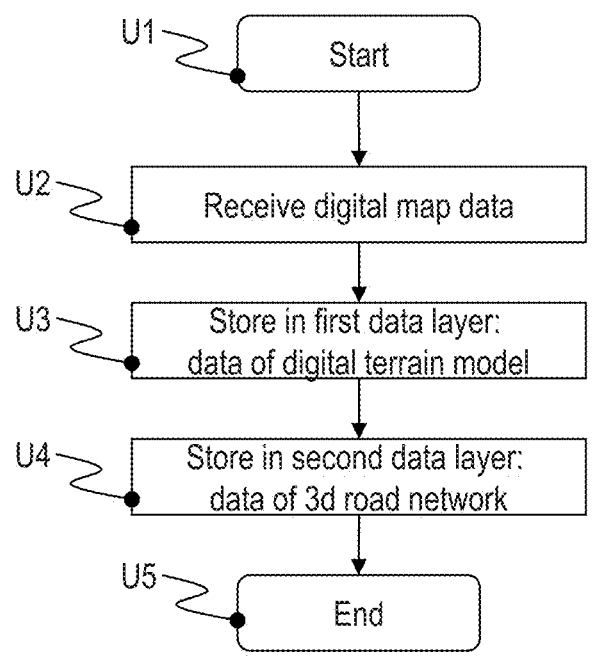
FIG. 14 is a flowchart of a method of generating the database storing the data which defines the 3d geographical map.

In FIG. 14, a flowchart of a method of generating the database 101 is depicted. The method starts with step U1.

In step U2, digital map data is received. The digital map data comprises the various 3d elements such as the houses and POIs 230, the vegetation 240, the 3d road network 220, and the DTM 210.

In step U3, the DTM 210 is stored in the first data layer 110a.

Next, in step U4, the data of the 3d road network 220 is stored in the second data layer 110b.

From the steps U3, U4, the database 101 is obtained.

The method ends in step U5.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

The invention claimed is:

1. A map viewer for displaying a three-dimensional, 3d, map view of a 3d geographical map, the map viewer comprising:
   a database storing data which defines the 3d geographical map, wherein said data comprises at least one of 3d elements, 3d polygons, or wireframes, wherein the database stores the data in a layered hierarchy comprising data layers which can be individually rendered for the 3d map view, wherein the database comprises at least the following data layers:
      a data layer of a digital terrain model which is modelling a terrain surface, and
      a data layer of a 3d road network comprising 3d road elements;
   a processor for rendering the 3d map view and coupled to the database, the processor being configured to:
      select specific data layers of the database in response to a resolution setting of the 3d map view, wherein the resolution setting of the 3d map view and the selection of the specific data layers of the database are based on a current position of a vehicle in which the map viewer is located, and
      render the 3d map view using the selected specific data layers of the database; and
   an optical output device, configured for displaying the rendered 3d map view.

2. The map viewer of claim 1, wherein the processor is configured to individually render the data of the selected specific data layers and to subsequently overlay the individually rendered data to obtain the 3d map view.

3. The map viewer of claim 1, wherein the 3d road elements of the data layer of the 3d road network model a road surface and a height difference between the road surface and the terrain surface of the digital terrain model.

4. The map viewer of claim 3, wherein the 3d road elements model the road surface such that the road surface has smoother height variations when compared to the underlying terrain surface of the digital terrain model.

5. The map viewer of claim 3, wherein the data layer of the 3d road network includes indicators indicating faces of the 3d road elements corresponding to the road surface,
wherein the processor is further configured to render the 3d map view using predefined textures for the road surface based on the indicators.

6. The map viewer of claim 3, wherein the 3d road elements further comprise elements selected from the group comprising:
ramps connecting the road surface of a particular 3d road element elevated above the terrain surface of the digital terrain model with the terrain surface of the digital terrain model;
bridges; and
street sidewalks.

7. The map viewer of claim 3, wherein the processor is configured to render the 3d map view such that it includes a graphical representation of a planned route obtained from a navigation unit, the graphical representation of the planned route being indicated for the road surfaces of the road elements.

8. The map viewer of claim 1, wherein the data further includes two-dimensional, 2d, textures at least for the data layers of the digital terrain model and the 3d road network,
wherein the processor is configured to select particular 2d textures for at least one of the terrain surface and the 3d road elements depending on a mode of operation and to render the 3d map view using the selected at least one of 2d textures for the respective terrain surface and the respective 3d road elements.

9. The map viewer of claim 1, wherein the digital terrain model further includes road tunnels.

10. The map viewer of claim 9, wherein the data layer of the digital terrain model includes indicators indicating faces of at least one of:
a side wall of the tunnel;
a ceiling of the tunnel;
a floor of the tunnel;
a terrain surface located above the ceiling of the tunnel;
a tunnel portal;
wherein a 3d road element of the 3d road network data layer is located on the floor of the tunnel.

11. The map viewer of claim 10, wherein the processor is further configured to select particular faces of the digital terrain model based on the indicators and to exclude the selected particular faces from the rendering of the 3d map view.

12. The map viewer of claim 1, wherein the data further comprises separate data layers selected from the group comprising:
a data layer of at least one of buildings and landmarks modelled by 3d models;
a data layer of at least one of traffic lights and traffic signs;
a data layer of public transportation; and
a data layer of vegetation.

13. The map viewer of claim 1, wherein rendering the 3d map view using the selected specific data layers of the database further comprises:
selecting at least one 2d pixel from each of the selected specific data layers; and
overlaying the 2d pixels from the selected specific data layers to render the 3d map view.

14. A method of displaying a three-dimensional, 3d, map view of a 3d geographical map on a map viewer, the method comprising:
retrieving data which defines the 3d geographical map from a database, wherein said data comprises at least one of 3d elements, 3d polygons, or wireframes, wherein the retrieved data is stored in the database in a layered hierarchy comprising data layers which can be individually rendered for the 3d map view, wherein the retrieved data comprises at least the following data layers:
a data layer of a digital terrain model which is modelling a terrain surface; and
a data layer of a 3d road network comprising 3d road elements;
selecting, using one or more computer processing, specific data layers of the retrieved data in response to a resolution setting of the 3d map view, wherein the resolution setting of the 3d map view and the selection of the specific data layers of the database are based on a current position of a vehicle in which the map viewer is located;
rendering the 3d map view using the selected specific data layers of the retrieved data; and
transmitting for display the rendered 3d map view on an optical output device.

15. The method of claim 14, wherein rendering the 3d map view using the selected specific data layers of the database further comprises:
selecting at least one 2d pixel from each of the selected specific data layers; and
overlaying the 2d pixels from the selected specific data layers to render the 3d map view.

16. The method of claim 14, wherein the 3d road elements of the data layer of the 3d road network model a road surface and a height difference between the road surface and the terrain surface of the digital terrain model.

17. A method of generating a database on a map viewer for storing data which defines a three-dimensional, 3d, geographical map, the method comprising:
receiving digital map data, the digital map data comprising a digital terrain model which is modelling a terrain surface and a 3d road network comprising 3d road elements,
storing in the database in a first data layer the data of the digital terrain model; and
storing in the database in a second data layer the data of the 3d road network, wherein said data which defines the 3d geographical map comprises at least one of 3d elements, 3d polygons, or wireframes, wherein the data layers can be individually rendered in a 3d map view, wherein specific data layers are selected for rendering and displaying in response to a resolution setting of the 3d map view, wherein the resolution setting of the 3d map view and the selection of the specific data layers of the database are based on a current position of a vehicle in which the map viewer is located.

18. The method of generating a database of claim 17, wherein the generated database is employed for executing the method of displaying the 3d geographical map.

* * * * *